United States Patent Office 2,783,521
Patented Mar. 5, 1957

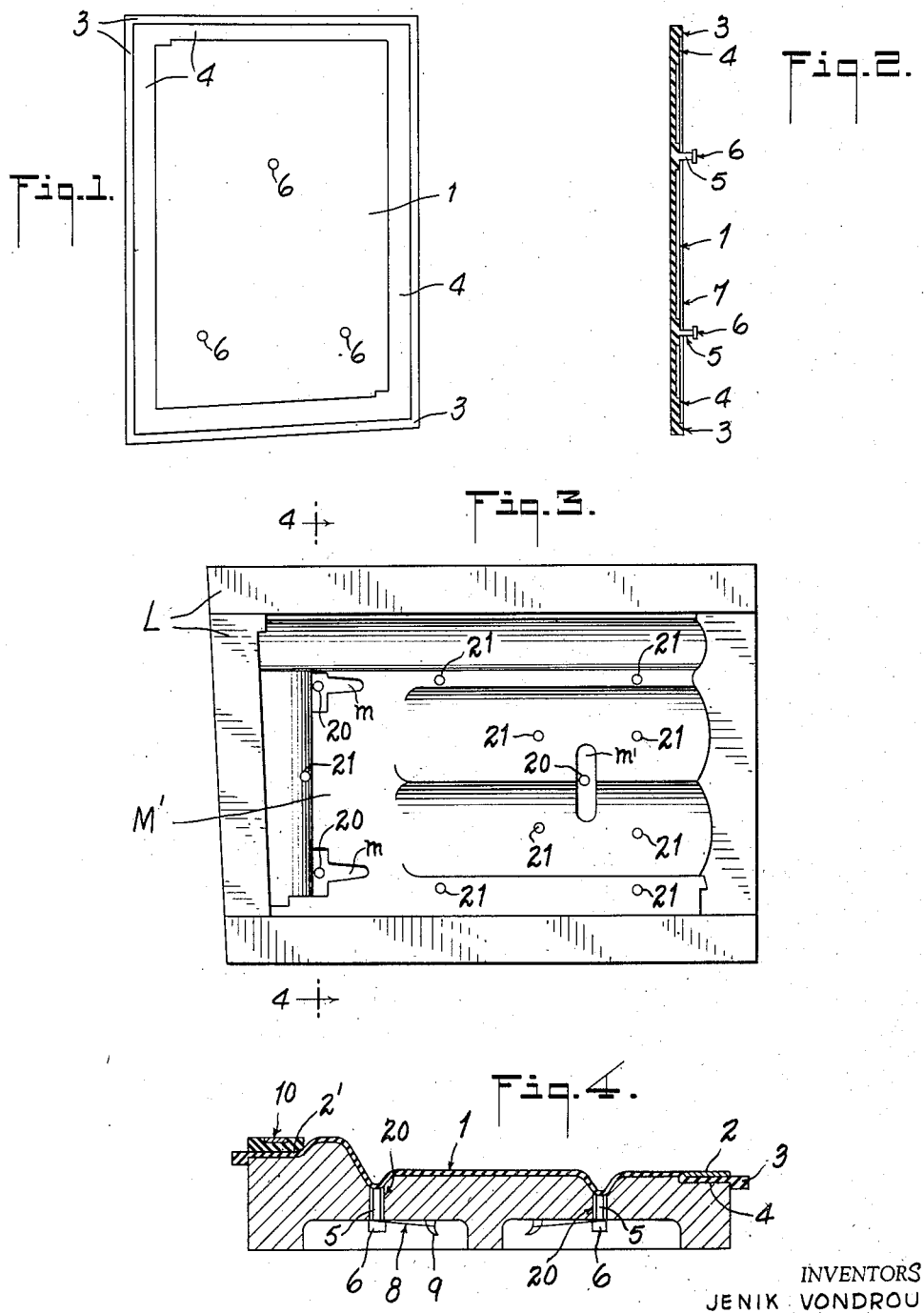

2,783,521

APPARATUS FOR MOLDING CERAMIC ARTICLES

Jenik Vondrous and Alberto Ferrero, Turin, Italy, assignors of thirty-five percent to Fornaci Riunite S. p. A., Turin, Italy Application July 30, 1952, Serial No. 301,622

Claims priority, application Italy August 17, 1951

3 Claims. (Cl. 25—122)

Molding of ceramic articles and bricks from relatively moist pastes of moldable material has heretofore generally been carried out by means of molds lined with chalk in order to permit removal of the molded article without danger of injuring even the smallest details of the shape reproduced on the article.

These chalk molds suffer from several drawbacks, viz.:

(1) They are subject to rapid wear and lose the details of their shape so that the molded articles increase in thickness and weight and no longer accurately reproduce the desired shapes after a short period of use of the molds;

(2) The necessary replacement of the molds is the cause of frequent stoppage in manufacture and makes necessary a large stock of replacement molds;

(3) A special department and skilled workers are required for preparing the molds.

This invention eliminates the above drawbacks, avoiding rapid wear of the molds and consequent replacement thereof.

According to this invention it has been ascertained that a rubber layer, even if this be very thin, which lines the shaped molding surface of the mold, facilitates removal of the moist paste of the brick or ceramic article, which is shaped by the said mold by virtue of the elasticity of rubber which is compressed by the molding pressure and on cutting off of the molding pressure it resumes its position by displacements which facilitate said removal and eliminate the so-called suction effect or sticking of the molded article in a relatively moist condition to the molds, when these are made of a material other than chalk, e. g. metal.

An object of this invention is to provide a thin rubber layer which is not permanently fixed to the shaped mold surface. The rubber layer is stretched in the front of said surface upon a frame, which can be a part of the mold or separately attached thereto.

Further improvements according to this invention concern details of the structure of the rubber sheet which is interposed between the mold and clay or kaolin lump to be shaped, more particularly for attachment to the lower mold, means for expelling any air between the rubber layer and mold in the recessed mold portions under molding pressure, means consisting of resilient fingers distributed at predetermined regions for connecting the rubber layer to the mold, and the manner of securing the rubber layer to the molds.

On molding the paste of clay, kaolin or the like under pressure for molding bricks or ceramic articles, the rubber sheet is pressed against the shaped mold surface, and it fully adheres to all parts of the mold thereby accurately reproducing and transmitting its shape to the article. As the molding pressure is released, the upper mold is removed from the article, the rubber layer resumes by elasticity its initial form and the consequent displacements greatly improve loosening of the article from the mold, permitting access of air between the article and mold.

The considerable economy obtainable by the apparatus according to this invention will be obvious, in view of the practically unlimited life of the molds as well as of the rubber sheet or layer which, on the other hand, can be promptly interchanged, and requires for replacement much less time than a chalk mold.

Moreover, the shaped articles will be of constant thickness and all their smallest details will always be accurately and identically reproduced.

The apparatus of this invention will now be described by way of example with reference to the accompanying drawing, in which:

Fig. 1 is a lower view of a rubber sheet or layer for the lower mold member constructed in accordance with the invention;

Fig. 2 is an approximate longitudinal sectional view of the sheet shown in Fig. 1;

Fig. 3 is a plan view of the lower mold member, the upper mold member not being illustrated; and Fig. 4 is a sectional view of an enlarged scale of the mold member shown in Fig. 3 as seen approximately along the line 4—4 of Fig. 3, the rubber sheet being shown in secured position on the mold member.

In the embodiment shown in the drawing, M' denotes a lower metal mold member which has a rubber sheet 1 secured over its contoured upper surface. The rubber sheet 1 is provided, for attachment to the mold member M', with an enlarged peripheral edge 3, which projects from the lateral mold wall, when the sheet is mounted on the mold (Figure 4) and is clamped by means of the strips 2, 2'.

The rubber sheet is formed within the edge 3 with a peripheral strip or bead 4, which is greater in thickness than the sheet 1, but smaller than edge 3, and equalling in width the edges of the mold on which the strips 2, 2' are mounted.

Moreover, the sheet 1 is formed with fingers 5 each ending in a head 6, the rubber sheet being thicker near the fingers, as shown at 7. Each finger extends through an associated hole 20 in the mold M' (Figure 4), the head 6 projecting outwardly from the lower mold surface, and having fixed thereto an anchoring wire 8, which is anchored to a hook 9 on the mold for preventing release of the finger against the tension under which the rubber sheet 1 is assembled.

The purpose of the fingers 5 is to limit the resilient movement of the rubber sheet, so that the molded article is not expelled from the machine after lifting of the upper mold (not shown) but is merely loosened from both molds and remains on the lower mold for removal by the operator in the next step of the process.

In the embodiment shown, the fingers 5 are provided on the rubber sheet in the areas m of the mold the ribs defining for fastening the tile being molded to the roof frame members and in the areas defining the perforated cross members m' (Figure 3). The rubber sheet is secured to the mold by means of the strips 2 and 2' which are made of rubber along the edges L (Figure 3) of the mold along which they will come into contact with the clay to be molded.

The strips 2' are provided with a metallic reinforcement core 10 which stiffens them against warping.

Since the metal mold is formed with depressed regions (Figure 3), forming air pockets closed at the top by the stretched rubber sheet, the shape of the molding surface would tend to be altered during molding when the top mold is brought against the tile clay for molding it.

The invention eliminates this drawback by providing in the mold at the depressed regions air relief holes 21 extending completely through the mold.

What we claim is:

1. In a mold having a rigid recessed molding surface a separate resilient sheet extending over said surface and resiliently movable relatively to said surface, at least one anchoring finger extending from the sheet, a hole in the mold, said finger projecting outwardly through said hole, and means securing the projecting end of the finger to the mold, said finger limiting the resilient movements of the sheet.

2. In a mold having a rigid molding surface with at least one recess therein, a separate resilient sheet extending over said surface and resiliently movable relatively to said surface, an anchoring finger extending from the sheet towards the recess, a hole in said recess, said finger projecting outwardly through said hole, and means securing the projecting end of the finger to the mold, said finger limiting resilient movements of the sheet.

3. In a mold as claimed in claim 2, said securing means including a head on the projecting end of the finger, and clamping means securing said head to the mold.

References Cited in the file of this patent

UNITED STATES PATENTS

| | | |
|---|---|---|
| 413,453 | Mitchell | Oct. 22, 1889 |
| 1,958,184 | Cross | May 8, 1934 |
| 2,290,910 | Jeffery | July 28, 1942 |
| 2,512,275 | Hawk | June 20, 1950 |
| 2,513,785 | Browne | July 4, 1950 |